(12) United States Patent
Andersen et al.

(10) Patent No.: US 12,151,786 B2
(45) Date of Patent: Nov. 26, 2024

(54) MOORING BUOY

(71) Applicant: STILLSTROM A/S, Copenhagen (DK)

(72) Inventors: Wilhelm Kjetil Andersen, Stavanger (NO); Ferdinando Samona, Lyngby (DK)

(73) Assignee: STILLSTROM A/S, Copenhagen (DK)

( * ) Notice: Subject to any disclaimer, the term of this patent is extended or adjusted under 35 U.S.C. 154(b) by 229 days.

(21) Appl. No.: 17/473,331

(22) Filed: Sep. 13, 2021

(65) Prior Publication Data
US 2022/0081073 A1   Mar. 17, 2022

(30) Foreign Application Priority Data

Sep. 15, 2020 (DK) .................................. 202001036

(51) Int. Cl.
| | | |
|---|---|---|
| B63B 22/02 | (2006.01) | |
| B63B 21/20 | (2006.01) | |
| B63B 21/50 | (2006.01) | |
| B63B 22/04 | (2006.01) | |
| B63B 45/04 | (2006.01) | |

(Continued)

(52) U.S. Cl.
CPC .............. *B63B 22/02* (2013.01); *B63B 21/20* (2013.01); *B63B 21/50* (2013.01); *B63B 22/04* (2013.01); *B63B 59/02* (2013.01); *B63B 79/10* (2020.01); *B63B 45/04* (2013.01)

(58) Field of Classification Search
CPC ......... B63B 22/00; B63B 22/02; B63B 22/04; B63B 21/20; B63B 21/50; B63B 59/02; B63B 79/10; B63B 45/04; B63J 3/04; Y02T 70/10

USPC ........................................................... 441/3
See application file for complete search history.

(56) References Cited

U.S. PATENT DOCUMENTS

| | | | |
|---|---|---|---|
| 2,903,716 A | | 9/1959 | Zasada |
| 3,913,157 A | * | 10/1975 | Versluis ................ B63B 22/021 |
| | | | 242/390.4 |
| 5,431,589 A | | 7/1995 | Corona |

(Continued)

FOREIGN PATENT DOCUMENTS

| | | |
|---|---|---|
| DE | 700022 C | 12/1940 |
| EP | 1832798 A1 | 9/2007 |

(Continued)

OTHER PUBLICATIONS

International Search Report and Written Opinion dated Nov. 9, 2021.

(Continued)

*Primary Examiner* — Daniel V Venne
(74) *Attorney, Agent, or Firm* — EIP US LLP

(57) ABSTRACT

A mooring buoy for a vessel comprises a floating body comprising a first portion and a second portion, wherein the first portion is rotatable with respect to the second portion. At least one anchoring line is connected between the second portion and the sea floor. At least one electric cable is mounted on the first portion and connected to a power supply. The at least one electric cable has a free end connectable to an electric circuit of the vessel. At least one mooring line is connectable between the floating body and the vessel. The mooring buoy comprises a cable length adjustment mechanism configured to adjust the length of the at least one electric cable when the first portion rotates with respect to the second portion.

23 Claims, 12 Drawing Sheets

(51) Int. Cl.
    *B63B 59/02*      (2006.01)
    *B63B 79/10*      (2020.01)

(56) References Cited

U.S. PATENT DOCUMENTS

| | | | |
|---|---|---|---|
| 6,050,747 A | 4/2000 | Midttveit | |
| 7,510,452 B2 * | 3/2009 | Van Tol | B63B 21/508 441/5 |
| 7,993,176 B2 * | 8/2011 | Lunde | B63B 22/023 441/3 |
| 7,997,223 B2 * | 8/2011 | Bailey | B63B 22/02 114/230.22 |
| 2010/0112879 A1 | 5/2010 | De Ocariz et al. | |
| 2013/0266381 A1 | 10/2013 | Pettersen | |
| 2017/0356423 A1 | 12/2017 | Galdos Tobalina | |

FOREIGN PATENT DOCUMENTS

| | | |
|---|---|---|
| EP | 2640632 B3 | 3/2016 |
| FR | 2961785 A1 | 12/2011 |
| GB | 1509909 A | 5/1978 |
| KR | 101865063 B1 | 6/2018 |
| WO | WO-99/57008 A1 | 11/1999 |
| WO | WO-2005059432 A1 | 6/2005 |

OTHER PUBLICATIONS

First Technical Examination including Search Report and Search Opinion dated Mar. 9, 2021 in Danish Application No. PA 2020 01036.

Singapore Search Report and Written Opinion dated Dec. 20, 2023 for Singapore Application No. 11202301717P.

European Extended Search report dated Sep. 30, 2024 for European application No. 21868780.4.

* cited by examiner

MOORING BUOY

CROSS-REFERENCE TO RELATED APPLICATION(S)

This application claims priority under 35 U.S.C. § 119 to Danish Patent Application No. PA 2020 01036, filed Sep. 15, 2020, the entire contents of which are incorporated herein by reference.

BACKGROUND

Field

The present invention relates to a mooring buoy for a vessel. In particular, the present invention relates to a mooring buoy for providing power to the vessel.

Description of Related Art

In the maritime industry it is often required to moor vessels when they are not in operation. In some locations, quayside space is at a premium and there is not enough space for every vessel to dock. Accordingly some vessels are moored offshore to a mooring buoy while the vessel waits to dock or before the vessel is deployed.

In most circumstances, the vessel will consume energy even when moored. This is because a moored vessel may have a residual "hotel load". For example, the crew accommodation will require lighting and heating which consumes power. The command bridge and the instruments on the command bridge will also require power. A moored vessel may also need to carry out some deck operations with equipment that will also require power. Accordingly, a moored vessel may operate a primary or an auxiliary genset to provide power for the hotel load and other power demands.

This is undesirable because running the primary or auxiliary genset for only a hotel load will inefficiently consume fuel and emit exhaust emissions such as particulate pollution and $CO_2$ emissions. This may be particularly an issue if the vessel is moored close to shore within a low emissions zone.

In order to reduce emissions of moored vessels, it is known to "cold iron" vessel by providing an external power supply to the moored vessel. This means that the primary or auxiliary genset of the vessel does not need to be operational when the vessel is moored or at berth in a port.

Once such known solution is shown in US2013/0266381 which discloses a transfer system for a subsea installation which is fixed to the seabed. The transfer system comprises a transfer element such as a cable for transferring an electric current to a floating arrangement such as a vessel. The transfer system comprises a subsea fender which holds the cable when not in use. A problem with this arrangement is that the electric cable can be placed under significant tension and damaged if the vessel moves or turns with respect to the transfer system due to wind shear or sea currents.

Furthermore, the transfer system requires the vessel to be using a dynamic positioning system and vessel thrusters in order to keep the vessel in the same location of the transfer system whilst the fluid is transferred to the vessel. Maintaining a dynamic positioning system will use fuel operating the thrusters and emit exhaust emissions. This means that the transfer system is not practical for mooring the vessel for more than a few hours particularly if the location is close to shore.

Another mooring buoy for a pleasure craft is shown in US 2010/0112879. US 2010/0112879 discloses a satellite element providing connections to a water hose and an electricity cable. The water hose and electricity cable are retractable and the pleasure craft can moor alongside the buoy and a user can tie the pleasure craft to the buoy. A problem with this arrangement is that the boat cannot freely weathervane around the buoy because the water hose and other cables will twist and bend. This can damage the connections to the boat and hoses, cables etc when moored.

SUMMARY

Examples of the present disclosure aim to address the aforementioned problems.

According to a first aspect of the present disclosure there is a mooring buoy for a vessel comprising: a floating body comprising a first portion and a second portion wherein the first portion is rotatable with respect to the second portion; at least one anchoring line connected between the second portion and the sea floor; at least one electric cable mounted on the first portion and connected to a power supply and the at least one electric cable has a free end connectable to an electric circuit of the vessel; at least one mooring line connectable between the floating body and the vessel; and wherein the mooring buoy comprises a cable length adjustment mechanism configured to adjust the length of the at least one electric cable when the first portion rotates with respect to the second portion.

Optionally, the cable length adjustment mechanism comprises a rotatable drum configured to spool the at least one electric cable.

Optionally, a rotation axis of the rotatable drum is aligned with a rotation axis of the first portion.

Optionally, the cable length adjustment mechanism comprises a motor coupled to the rotatable drum.

Optionally, the cable length adjustment mechanism comprises a controller configured to issue control signals to the motor for rotating the drum and retracting or extending the at least one electric cable.

Optionally, the cable length adjustment mechanism comprises a tension sensor configured to detect the tension in the at least one electric cable.

Optionally, the controller is configured to issue a control signal to the motor to extend or retract the at least one electric cable in dependence of a detected tension in the at least one electric cable.

Optionally, the controller is configured to maintain a tension in the at least one electric cable within a predetermined tension range.

Optionally, a tension in the at least one electric cable is less than a tension in the mooring line when the mooring line and the at least one electric cable are connected to the vessel.

Optionally, the mooring line is connected to floating body at a position closer to the water level than a position where the at least one electric cable extends from the first portion to the vessel.

Optionally, the mooring line is connected to the first portion.

Optionally, the mooring line is slidably mounted to the second portion and arranged to slide around the perimeter of the second portion.

Optionally, the first portion comprises a mooring line body portion coupled to the mooring line and an electric cable body portion coupled to the at least one electric cable and the mooring line body portion is rotatable with respect to the electric cable body portion.

Optionally, the mooring buoy comprises a fender arranged to prevent the vessel colliding with the floating body.

Optionally, the mooring buoy comprises an electrical slip ring mounted between the first portion and the second portion.

Optionally, the mooring buoy comprises an input electric cable electrically connectable to the at least one electric cable.

Optionally, the mooring buoy comprises at least one junction box connected between the input electric cable and the at least one electric cable.

Optionally, the mooring buoy comprises at least one transformer.

Optionally, the transformer is configured to supply the voltage at 440V or 690V.

Optionally, the mooring buoy comprises a battery electrically connected to the at least one cable wherein the battery is configured to supply electrical power to the at least one cable when the power supply is interrupted.

Optionally, the mooring buoy comprises a moonpool arranged to receive an input electric cable electrically connectable to the at least one electric cable.

Optionally, the moonpool comprises a cable funnel arranged to receive the input electric cable.

According to a second aspect of the disclosure, there is provided a mooring buoy for a vessel comprising: a floating body comprising a first portion and a second portion wherein the rotatable portion is first with respect to the second portion; at least one anchoring line connected between the second portion and the sea floor; at least one electric cable mounted on the first portion and connected to a power supply and the at least one electric cable has a free end connectable to an electric circuit of the vessel; at least one mooring line connectable between the floating body and the vessel; and wherein the mooring buoy comprises a battery electrically connected to the at least one cable wherein the battery is configured to supply electrical power to the at least one cable when the external power supply is interrupted.

According to a third aspect of the disclosure, there is provided a method of mooring a vessel with a mooring buoy having a floating body comprising a first portion and a second portion wherein the first portion is rotatable with respect to the second portion and the mooring buoy comprises at least one buoy anchoring line connected between the second portion and the sea floor, wherein the method comprises: connecting at least one mooring line between the floating body portion and the vessel; extending a free end of at least one electric cable from the first portion wherein the at least one electric cable is connected to a power supply; connecting the free end of the at least one electric cable to an electric circuit of the vessel when the vessel is tethered to the at least one mooring line; and adjusting with a cable length adjustment mechanism the length of the at least one electric cable when the first portion rotates with respect to the second portion.

BRIEF DESCRIPTION OF THE DRAWINGS

Various other aspects and further embodiments are also described in the following detailed description and in the attached claims with reference to the accompanying drawings, in which:

DETAILED DESCRIPTION

Figure 1:
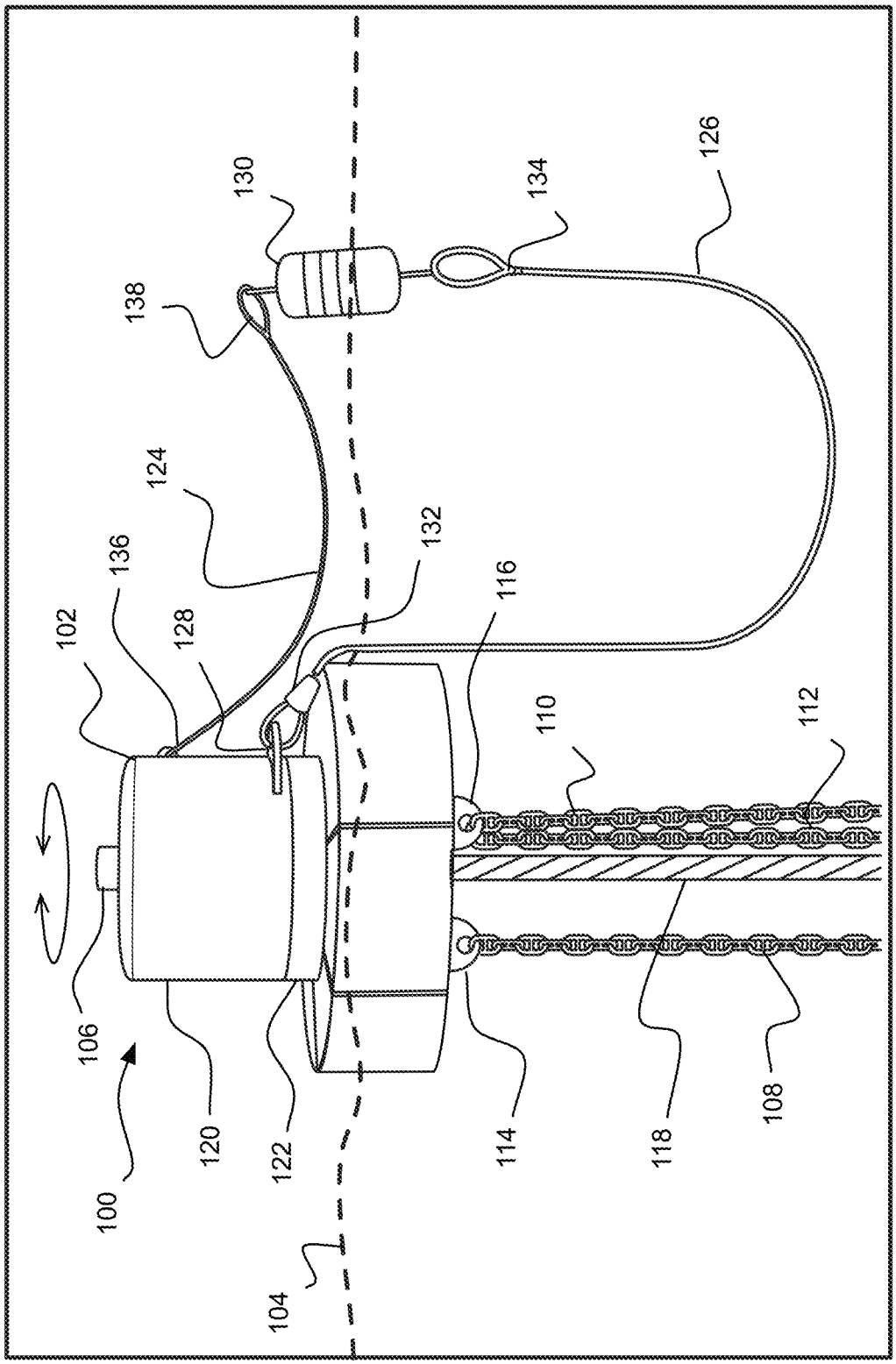
FIG. 1 shows a side view of a mooring buoy according to an example.

FIG. 1 shows a side view of a mooring buoy 100 for mooring a vessel 700. FIG. 1 does not show a vessel 700 to be moored but the vessel 700 is best shown in e.g. FIG. 7 or FIG. 10.

The vessel 700 can be an anchor handling vessel, platform supply vessel (PSV), multipurpose support vessel (MSV), tugboat, ice breaker, patrol boat, fishing vessel, coast guard vessel, navy vessel, fire-fighting vessel, container ship, bulk carrier, barge, tanker, or any other vessel which can be moored.

The mooring buoy 100 comprises a floating body 102 and at least a portion of the floating body 102 projects out of the surface 104 of the water. The portion of the floating body 102 that projects out of the water can be brightly coloured for contrasting with the water. In some examples, one or more beacons 106 can be mounted on the floating body 102 for alerting vessels of the presence of the mooring buoy 100. In some examples, the floating body 102 always projects out of the water. This means that the mooring buoy 100 is not submersible and this means a vessel 700 can always find the mooring buoy 100 when mooring to the mooring buoy 100.

The beacon 106 in some examples is an electric light or an LED. In some examples, the beacon 106 is configured to change colour to indicate a status of the mooring buoy 100. Additionally or alternatively the beacon 106 is configured to flash and/or vary the periodicity of the flashing to indicate a status of the mooring buoy 100. In some examples the beacon 106 comprises a foghorn (not shown) for warning nearby vessel 700.

In some examples, the beacon 106 is configured to operate with a first colour to indicate that the mooring buoy 100 is operating in a first mode of operation. In some examples the beacon 106 is configured to operate with a second colour, different from the first colour to indicate that the mooring buoy 100 is operating in a second mode of operation. In some examples, the first colour of the beacon 106 indicates that the mooring buoy 100 is disconnected from the vessel 700. In some examples, the second colour of the beacon 106 indicates that the mooring buoy 100 is connected to the vessel 700. In some examples, the second colour indicates that there is a successful power connection from the mooring buoy 100 to the vessel 700. The power connection between the mooring buoy 100 and the vessel 700 will be discussed in further detail below.

Figure 2:
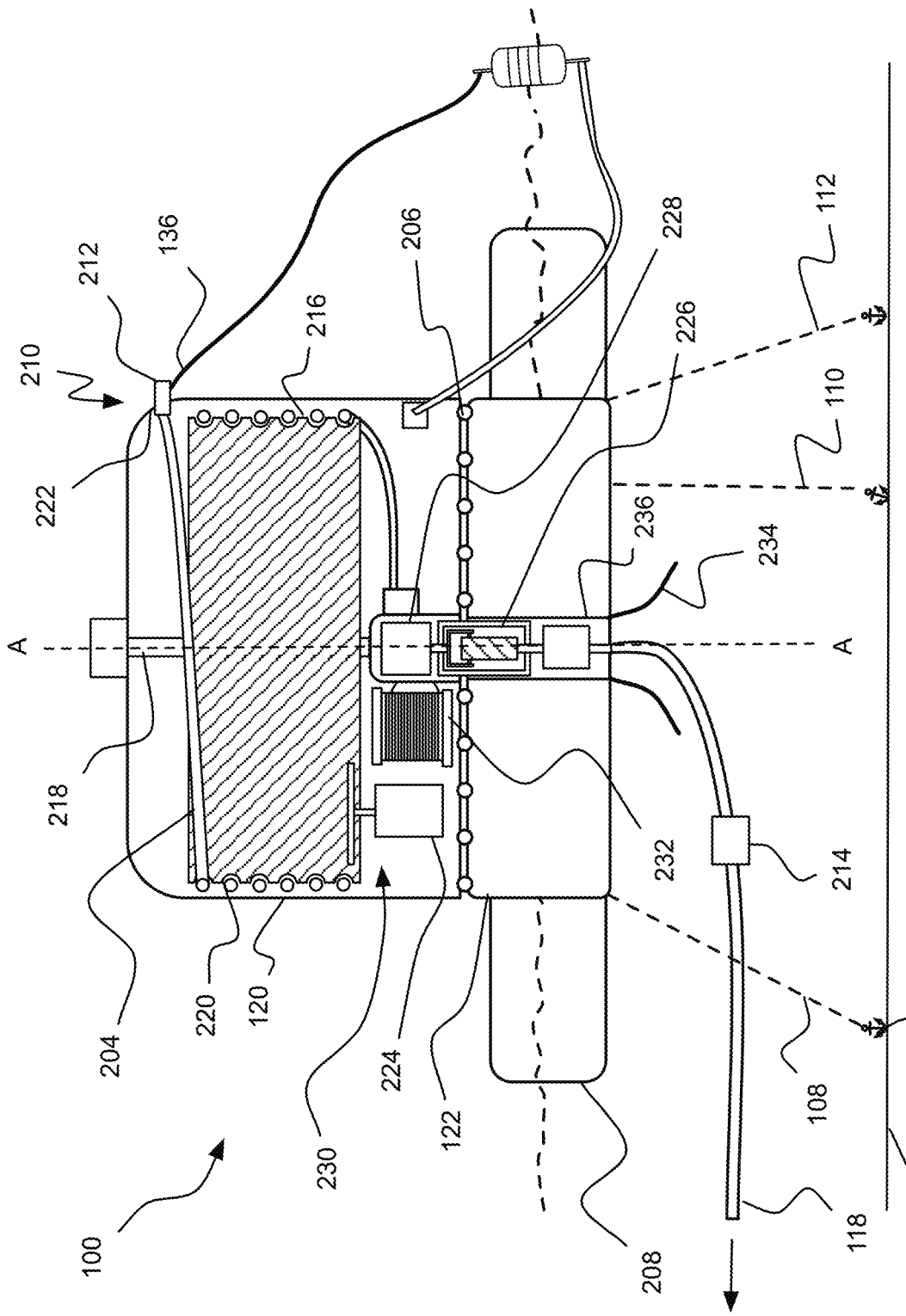
FIGS. 2 to 6 show cross-sectional side view of a mooring buoy according to an example.

In some examples, the mooring buoy 100 is anchored to the sea floor 200 (e.g. as shown in FIG. 2) with a plurality buoy anchoring lines 108, 110, 112 connected between the floating body 102 and the sea floor 200. The buoy anchoring lines 108, 110, 112 are not to scale and schematically shown in FIG. 2 with respect to the sea floor 200, the surface 104 of the water and the mooring buoy 100.

The buoy anchoring lines 108, 110, 112 are connected to the floating body 102 at one or more mooring eyes 114, 116 fixed to the floating body 102. In some examples, the buoy anchoring lines 108, 110, 112 are optionally connected to the one or more mooring eyes 114, 116 via a shackle or a swivel mechanism (not shown) for allowing relative rotation between the buoy anchoring lines 108, 110, 112 and the one or more mooring eyes 114, 116. In some examples, as shown in FIG. 1 the mooring eyes 114, 116 do not comprise a shackle or a swivel mechanism.

As mentioned above, the mooring buoy 100 is anchored to the sea floor 200. The buoy anchoring lines 108, 110, 112 are connected to mooring eyes (not shown) of a sinker 202 (schematically shown in FIG. 2). The sinker 202 is fixed with respect to the sea floor 200. In some examples, the buoy anchoring lines 108, 110, 112 are connected to the mooring eyes of the sinker 202 via a shackle or a swivel mechanism (not shown) for allowing relative rotation between the buoy anchoring lines 108, 110, 112 and the one or more mooring eyes of the sinker 202. The sinker 202 is embedded in the sea floor 200 or resting on the sea floor 200 and prevents the mooring buoy 100 from moving away from a predefined mooring location. In some other examples, the sinker 202 can be replaced with an anchor (not shown) or any other suitable means for fixing the buoy anchoring lines 108, 110, 112 with respect to the sea floor 200. The sinker 202 can be made from concrete, cast iron, rock, bundles or used chain or any other suitable material.

The buoy anchoring lines 108, 110, 112 in some examples are chains (as shown in FIG. 1) or alternatively mooring ropes or wires. In other examples, the buoy anchoring lines 108, 110, 112 can be a combination of a chain, rope and/or wire. In some examples, the three buoy anchoring lines 108, 110, 112 comprise an UHMwPE (Ultra High Molecular weight Polyethylene) or HMPE (High Modulus Polyethylene) fibre such as "DYNEEMA®". In some examples and as shown in FIG. 1, the mooring buoy 100 comprises a three-point mooring system using three buoy anchoring lines 108, 110, 112. Each of the buoy anchoring lines 108, 110, 112 is connected to a second portion 122. The second portion is some examples is a stationary portion 122 of the floating body 102 spaced apart circumferentially approximately at 120 degrees about the floating body 102 and respectively attached to separate sinkers 202. The term "stationary" indicates that the second portion 122 is anchored to the sea floor 200 and therefore limited in movement or fixed with respect to the sea floor 200. However, since the second portion 122 is floating in the water, the second portion 122 will be subjected to some movement e.g. heave or tidal forces and move up and down with respect to the sea floor 200. The stationary second portion 122 is some examples does not rotate with respect to the sea floor 200. In some examples, the second portion 122 is a lower portion and mounted at a lower position of the floating body 102. This can make fastening the buoy anchoring lines 108, 110, 112 easier and ensure that the buoy anchoring lines 108, 110, 112 do not interfere with other parts of the mooring buoy 100. Hereinafter, the second portion 122 will be referred to as the stationary portion 122.

The buoy anchoring lines 108, 110, 112 in some examples provide a slack mooring. In this way, when the loading on the mooring buoy 100 is at a maximum, the mooring buoy anchoring lines 108, 110, 112 catenary will meet the sea floor 200 some way from the sinker 202. By providing the buoy anchoring lines 108, 110, 112 with a chain on the sea floor 200, this increases the security of the mooring or may be used to reduce the size of the sinker 202. The slack mooring also allows the mooring buoy 100 to move up and down due to the heave motion of the water. Alternatively, the buoy anchoring lines 108, 110, 112 in some other examples provide a taught mooring and the buoy anchoring lines 108, 110, 112 are mooring ropes under tension between the floating body 102 and the sea floor 200.

An input subsea electric cable 118 is connected to the mooring buoy 100. The input subsea electric cable 118 is electrically connected to a power supply. The power supply can be provided via one or more external transformers which are connected to the power supply. The power supply in some examples is connected to a land-based electricity distribution network. Accordingly, the power supply and the one or more external transformers are located on-shore. In this way, the input subsea electric cable 118 connects the vessel 700 with shore power. Additionally or alternatively, the input subsea electrical cable 118 can be connected to an offshore power supply, such as an offshore wind farm (not shown). In other examples, the input subsea electric cable 118 can be connected to an offshore installation comprising power generation or power storage.

Turning back to FIG. 1, the mooring buoy 100 will be discussed in further detail. The floating body 102 comprises a first portion 120 and a second portion 122. The first portion 120 is rotatable with respect to the second portion 122. In some examples, the first portion 120 is rotatably mounted above the second portion 122 as shown in the accompanying Figures. However in other examples, the first portion 120 can be mounted underneath the second portion 122. In this way, the first portion 120 can be an upper first portion 120 of the floating body 102 and the second portion 122 can be a lower second portion 122 of the floating body 102.

Accordingly, the floating body 102 comprises a rotatable portion 120 and a stationary portion 122. The buoy anchoring lines 108, 110, 112 are fixed to the stationary portion 122 of the floating body 102. This means that the stationary portion 122 is substantially fixed with respect to the sea floor 200. The rotatable portion 120 is arranged to rotate about axis A-A (as best shown in FIG. 2) and as indicated by the double ended arrow in FIG. 1. Rotation of the rotatable portion 120 with respect to the stationary portion 122 will be discussed in more detail below.

The mooring buoy 100 comprises an output electric cable 204 (best shown in FIG. 2) for providing external power to the vessel 700. The output electric cable 204 is connected to a messenger line 124 at a first end 136 of the messenger line 124. A second end 138 of the messenger line 124 is connected to the messenger line buoy 130. Use of the messenger line 124 for connecting and mooring the vessel 700 to the mooring buoy 100 will be described in more detail below.

A mooring line 126 is connected to the floating body 102 at a first end 132 of the mooring line 126. A second end 134 of the mooring line 126 is arranged to be connected to a capstan (not shown) or another suitable mooring point on the vessel 700. In this way the mooring line 126 is arranged to tether the vessel 700 to the mooring buoy 100.

As shown in FIG. 1, the second end 134 of the mooring line 126 is also connected to the messenger line buoy 130. The mooring line 126 is draped into the water and sinks to form a "U-shape". The messenger line buoy 130 allows the second end 134 of the mooring line 126 to be identified and picked up by the vessel 700. Although not shown, the mooring line 126 can be retractable into the mooring buoy 100. In some examples, the mooring buoy 100 comprises a mooring line winding mechanism (not shown) such as a winch for retracting and extending the mooring line 126 with respect to the mooring buoy 100.

However, a preferred arrangement is that the second end 134 of mooring line 126 is remote from the mooring buoy 100. The prevailing current of the water and/or the wind will move the messenger line buoy 130 in the direction of the current until the messenger line 124 and/or the mooring line 126 are fulling extended in the water. This means that the vessel 700 does not have to approach too close to the mooring buoy 100 during a mooring operation.

Figure 6:
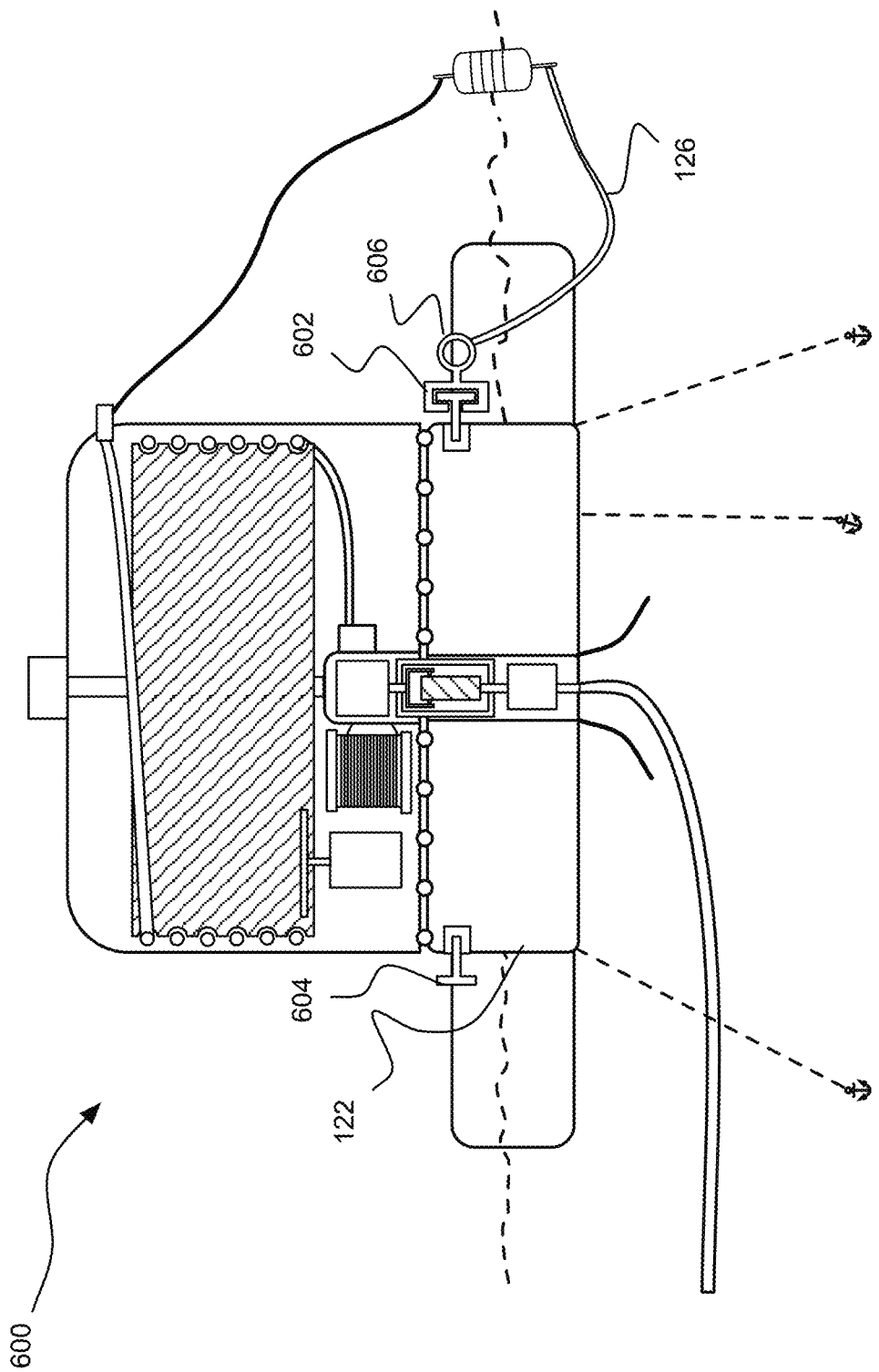

As shown in FIG. 1, the mooring line 126 is connected to the rotatable portion 120 via a mooring eye 128. This means that the mooring line 126 is configured to rotate about the stationary portion 122 with the rotatable portion 120. In some other examples, e.g. as shown in FIG. 6, optionally, the mooring line 126 is rotatably or slidably connected to the stationary portion 122. This alternative example will be discussed below in more detail with respect to FIG. 6.

The mooring buoy 100 comprises at least one mooring line 126 connectable between the mooring buoy 100 and the vessel 700. In some examples, the mooring line 126 is a chain or alternatively mooring ropes or wires. In other examples, the mooring line 126 can be a combination of a chain, rope and/or wire. In some examples, the mooring line 126 comprises an UHMwPE (Ultra High Molecular weight Polyethylene) or HMPE (High Modulus Polyethylene) fibre such as "DYNEEMA®" (a trade mark of Royal DSM N.V.) Alternatively, the mooring line 126 can be made from a material less dense than water such that it floats. For example, the mooring line 126 comprise an UHMwPE (Ultra High Molecular weight Polyethylene) or HMPE (High Modulus Polyethylene) fibre with a density less than the density of fresh water or salt water.

In some other less preferred examples, the messenger line 124 and the messenger line buoy 130 are optional. In this less preferred example the vessel 700 approaches the mooring buoy 100 and picks up the output electric cable 204 and the mooring line 126 without the aid of the messenger line 124.

Turning to FIG. 2, the mooring buoy 100 will be discussed in further detail. FIG. 2 shows a cross-section side view of the mooring buoy 100 according to an example. The floating body 102 of the mooring buoy 100 is substantially cylindrical. In other examples, the floating body 102 can be box shaped, conical, hemispherical or any other suitable shape.

The floating body 102 optionally comprises an annular fender 208 which circumferentially surrounds the outer surface of the stationary portion 122. The annular fender 208 is arranged to prevent the vessel 700 from damaging the floating body 102 if the vessel 700 collides with the mooring buoy 100. In some examples, the annular fender 208 is made from rubber or another resiliently deformable material arranged to absorb the impact of the vessel 700. The annular fender 208 is mounted to the stationary portion 122 however, in other examples the annular fender 208 can be mounted on the rotatable portion 120. A plurality of annular fenders 208 can be provided on the mooring buoy 100 at different heights from the surface 104 of the water.

Optionally, the mooring buoy 100 does not comprise the annular fender 208. Instead the mooring buoy 100 can be constructed from sufficiently durable materials to resist damage from vessel collision.

The rotatable portion 120 is rotatably mounted on the stationary portion 122 on a bearing 206 such as a thrust bearing. The bearing 206 is configured to support the weight of the rotatable portion 120. The bearing 206 is schematically shown in FIG. 2. However, the bearing 206 can be sealed to protect the bearing 206 from the marine environment. In some examples, the bearing 206 can be any suitable bearing to permit relative rotation between the rotatable portion 120 and the stationary portion 122. Any suitable means can be used to reduce the friction between the rotatable portion 120 and the stationary portion 122. In some examples, the bearing 206 is a thrust ball bearing, or a thrust needle bearing etc. In some other examples, the rotatable portion 120 is mounted on a central spindle via radial ball bearing, pillow block bearing etc.

This means that the rotatable portion 120 freely rotates with respect to the stationary portion 122 about the axis A-A. The axis of rotation A-A of the rotatable portion 120 is the central axis A-A of the mooring buoy 100. However, in other examples the axis of rotation A-A is off-centre from the central axis of the mooring buoy 100.

As mentioned above, the mooring buoy 100 is connected to an external power source via an input subsea electric cable 118. Optionally there are one or more subsea buoyancy elements 214 mounted to the input subsea electric cable 118. The one or more subsea buoyancy elements 214 are configured to create an S-profile of the input subsea electric cable 118 between the mooring buoy 100 and the sea floor 200. FIG. 2 only shows a portion of the input subsea electric cable 118 close to the mooring buoy 100 and the "S-profile" of the input subsea electric cable 118 is not shown for the purposes of clarity.

The stationary portion 122 of the mooring buoy 100 optionally comprises a funnel 234 for receiving the input subsea electric cable 118 on the underside of the mooring buoy 100. In some examples, the funnel 234 is mounted around the periphery of a moonpool 236 for receiving the input subsea electric cable 118 within the mooring buoy 100. The funnel 234 is curved and flared towards the outer edge of the stationary portion 122.

The curved surface of the funnel 234 is arranged to receive a portion of the input subsea electric cable 118. The curved surface is profiled to define a maximum bend radius of the input subsea electric cable 118. In some examples, the curved surface of the funnel 234 has a radius of between 1 m and 10 m. In some examples, the curved surface of the funnel 234 has a radius of 5 m. In other examples, the curved surface of the funnel 234 has a radius of 2 m, 3 m, 4 m, 6 m, 7 m, 8 m, 9 m, 15 m, or 20 m.

The mooring buoy 100 comprises a cable length adjustment mechanism 230 configured to adjust the length of the output electrical cable 204. The cable length adjustment mechanism 230 is configured to adjust the length of the output electrical cable 204 when the rotatable portion 120 rotates with respect to the stationary portion 122. This means when the output electrical cable 204 is connected to the vessel 700, adjustment of the length of the output electrical cable 204 can manage the tension in the output electrical cable 204. The cable length adjustment mechanism 230 is configured to adjust the length of the output electrical cable 204 when the moored vessel 700 moves away or toward the mooring buoy 100 due to environmental forces (such as the tide, current or wind). For example, the tension in the output electrical cable 204 can be maintained lower than the tension in the mooring line 126 even if the vessel 700 moves around the mooring buoy 100. This means that the tension in the output electrical cable 204 can be adjusted in dependence of environmental conditions, and the position and orientation of the vessel 700 with respect to the mooring buoy 100.

The output electrical cable 204 as shown in FIG. 2 is in a retracted position and the free end 210 of the output electrical cable 204 is moveable between the retracted position and an extended position. In the extended position, the output electrical cable 204 is connectable to the vessel 700.

The free end 210 of the output electrical cable 204 comprises a connector 212 for connection with a reciprocal connector (not shown) on the vessel 700. In some examples the connector 212 is a plug according to the standard ISO/IEC/IEEE 80005-3(-1*). In some examples, the free end 210 of the output electrical cable 204 comprises a plug or socket for connecting respectively with a socket or plug connected to an electric circuit of the vessel 700. The connector 212 and the output electrical cable 204 project out of the rotatable portion 120 through an exit hole 222. In FIG. 2, the output electrical cable 204 is fully retracted into the rotatable portion 120 and the connector 212 abuts the exit hole 222.

In some examples, the connector 212 comprises a rubber seal (not shown) for engaging the exit hole 222 when the connector 212 abuts the exit hole 222. This means that the exit hole 222 is sealed and reduces the amount of water that can enter the rotatable portion 120.

Figure 3:
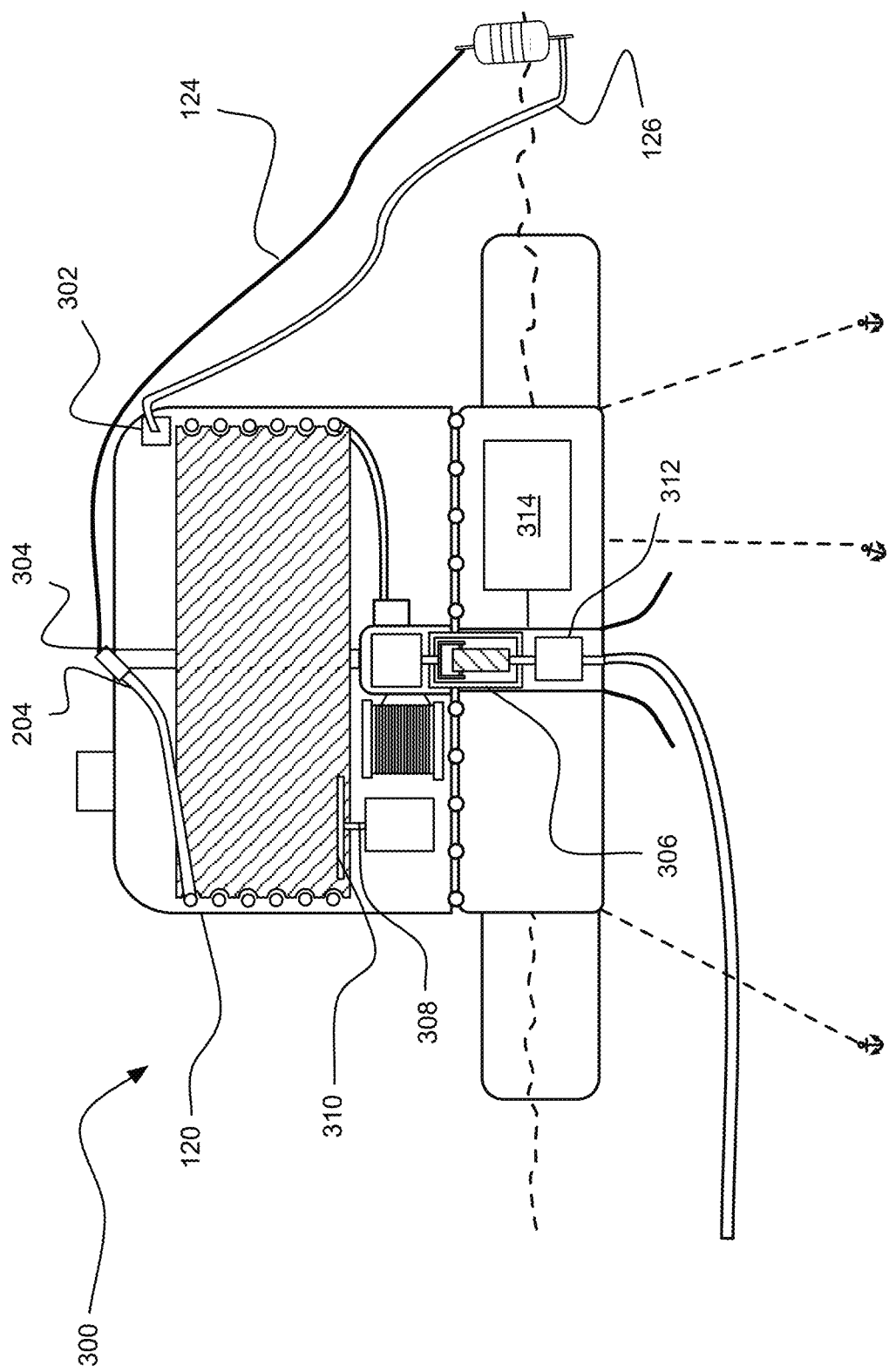

The output electrical cable 204 is electrically connected to the input subsea electric cable 118. A rotatable electrical connection 226 is mounted between the stationary portion 122 and the rotatable portion 120. In some examples the rotatable electrical connection 226 is an electrical slip ring. The electrical slip ring can be housed in an electrical slip ring canister 306 as shown in FIG. 3. The electrical slip ring canister 306 can seal the electrical connections of the electrical slip ring from the marine environment. The electrical slip ring 226 permits 360° rotation of the rotatable portion 120 with respect to the stationary portion 122 whilst maintaining an electrical connection between the output electrical cable 204 and the input subsea electric cable 118.

In some examples, the output electrical cable 204 and the input subsea electric cable 118 also comprise one or more data connections. In some examples, the rotatable electrical connection 226 is also a rotatable data connection. In this way, both power and data for example telemetry data relating to the operation of the mooring buoy 100 can be transmitted from the stationary portion 122 to the rotatable portion 120.

The rotatable electrical connection 226 is optionally connected to a rotating junction box 228. The rotating junction box 228 is mounted in the rotatable portion 120. The rotating junction box 228 is a sealed enclosure for housing connections between an output from the rotatable electrical connection 226 and the output electrical cable 204. In some examples, the connections between the output from the rotatable electrical connection 226 and the output electrical cable 204 are pigtail connections.

In some examples, a step down transformer 232 is optionally electrically connected between the output from the rotatable electrical connection 226 and the rotating junction box 228. In some examples, the step down transformer 232 is configured to supply the voltage at 440V, 690V and/or any other voltage as required by the vessel 700. In some examples the step down transformer 232 is configured to step down the voltage from 11 kV or 7 kV to 440V and/or 690V. The step down transformer 232 can have a plurality of taps for providing different voltages as required e.g. 440V or 690V. The step down transformer 232 is also mounted in the rotatable portion 120. In other examples, the step down transformer 232 can be a step up transformer 232 e.g. in the case where the input voltage received from the external power source is too low. Optionally a frequency converter (not shown) is connected to the step down transformer 232.

The step down transformer 232 is connected in series between the rotatable electrical connection 226 and the output electrical cable 204.

The rotatable electrical connection 226 is also optionally connected to a stationary junction box 312 (as best shown in FIG. 3). The stationary junction box 312 is mounted in the stationary portion 122. The stationary junction box 312 is a sealed enclosure for housing connections between an input from the rotatable electrical connection 226 and the input subsea electric cable 118. In some examples, the connections between the input from the rotatable electrical connection 226 and the input subsea electric cable 118 are pigtail connections.

Although not shown, another step down transformer can be provided between the input subsea electric cable 118 and the rotatable electrical connection 226. The other step down transformer may be required if the input voltage received from the external power source is too high e.g. 33 kV and the voltage needs to be stepped down to the correct voltage e.g. 7 kV or 11 kV rated for the rotatable electrical connection 226.

Alternatively the input subsea electric cable 118 provides the voltage at the same voltage provided by the output electrical cable 204 e.g. 440V or 690V. For example, an external step down transformer (not shown) can be provided adjacent to the mooring buoy 100 or an onshore step down transformer (not shown) is provided at a closest position to the mooring buoy 100 on land. In this case, the mooring buoy 100 comprises no transformers mounted in the rotatable portion 120 or the stationary portion 122.

Turning back to FIG. 2, the cable length adjustment mechanism 230 will be discussed in more detail. The cable length adjustment mechanism 230 comprises a winch having a rotatable drum 216 for winding the output electrical cable 204. The rotatable drum 216 is housed within the rotatable portion 120. The rotatable drum 216 is mounted on a spindle 218 aligned with the rotation axis A-A. The rotatable drum 216 is arranged to rotate with respect to the rotating portion 120 which causes the output electrical cable 204 to extend or retract. The rotatable drum 216 optionally comprises a groove 220 on the surface of the rotatable drum 216 for receiving the output electric cable 204 when the rotatable drum 216 retracts the output electrical cable 204. In some examples the rotatable drum 216 optionally comprises a moveable cable guide mechanism (not shown) arranged to move the output electrical cable 204 as the output electrical cable 204 is wound on to the rotatable drum 216. This means that the output electrical cable 204 is seated correctly when the output electrical cable 204 is wound onto the rotatable drum 216.

In a less preferred example the cable length adjustment mechanism 230 is a winch having a rotatable drum 216 which is mounted on a spindle having an axis of rotation perpendicular to the rotation axis A-A. This is less preferred because two electrical slip rings are required instead of a single electrical slip ring.

The rotatable drum 216 is coupled to an electric motor 224. The electric motor 224 is arranged to rotate the rotatable drum 216 with respect to the rotatable portion 120 and retract or extend the output electrical cable 204 accordingly. The electric motor 224 comprises a drive shaft 308 and a drive pinon 310 (best shown in FIG. 3) mounted thereto. The drive pinion 310 engages a reciprocal toothed inner surface (not shown) of the rotatable drum 216. In other examples, the electric motor 224 is coupled to a drive wheel (not shown) and the drive wheel engages a smooth reciprocal inner surface (not shown) of the rotatable drum 216.

Another example will now be described in reference to FIG. 3. FIG. 3 shows a cross-sectional side view of a mooring buoy 300 according to an example. The mooring buoy 300 as shown in FIG. 3 is the same as discussed with respect to FIG. 2, except that the mooring line 126 and the output electrical cable 204 are mounted to the rotatable portion 120 at different positions.

The mooring line 126 is connected to the rotatable portion 120 at an upper mooring eye 302. The output electrical cable 204 is extended and retracted through an upper exit hole 304 in the top of the rotatable portion 120. Positioning the mooring line 126 and the output electrical cable 204 higher on the rotating portion 120 may make retrieving the messenger line 124 easier from a vessel 700.

Optionally, the mooring buoy 100 comprises a battery 314 which is selectively connectable to the output electric cable 204. A controller 1100 (shown in FIG. 11) determines whether the external power source has been interrupted and connects the battery 314 to the output electric cable 204. This means that the mooring buoy 100 can still supply power to the vessel 700 for a period of time even if there is a power interruption. In some examples the battery 314 supplies sufficient power for enough time so that the vessel 700 can start a genset to provide electricity to the vessel 700. In some examples a combination of the battery 314 and the external power source e.g. power receive from a shore based supply can provide power to the output electric cable 204.

Figure 4:
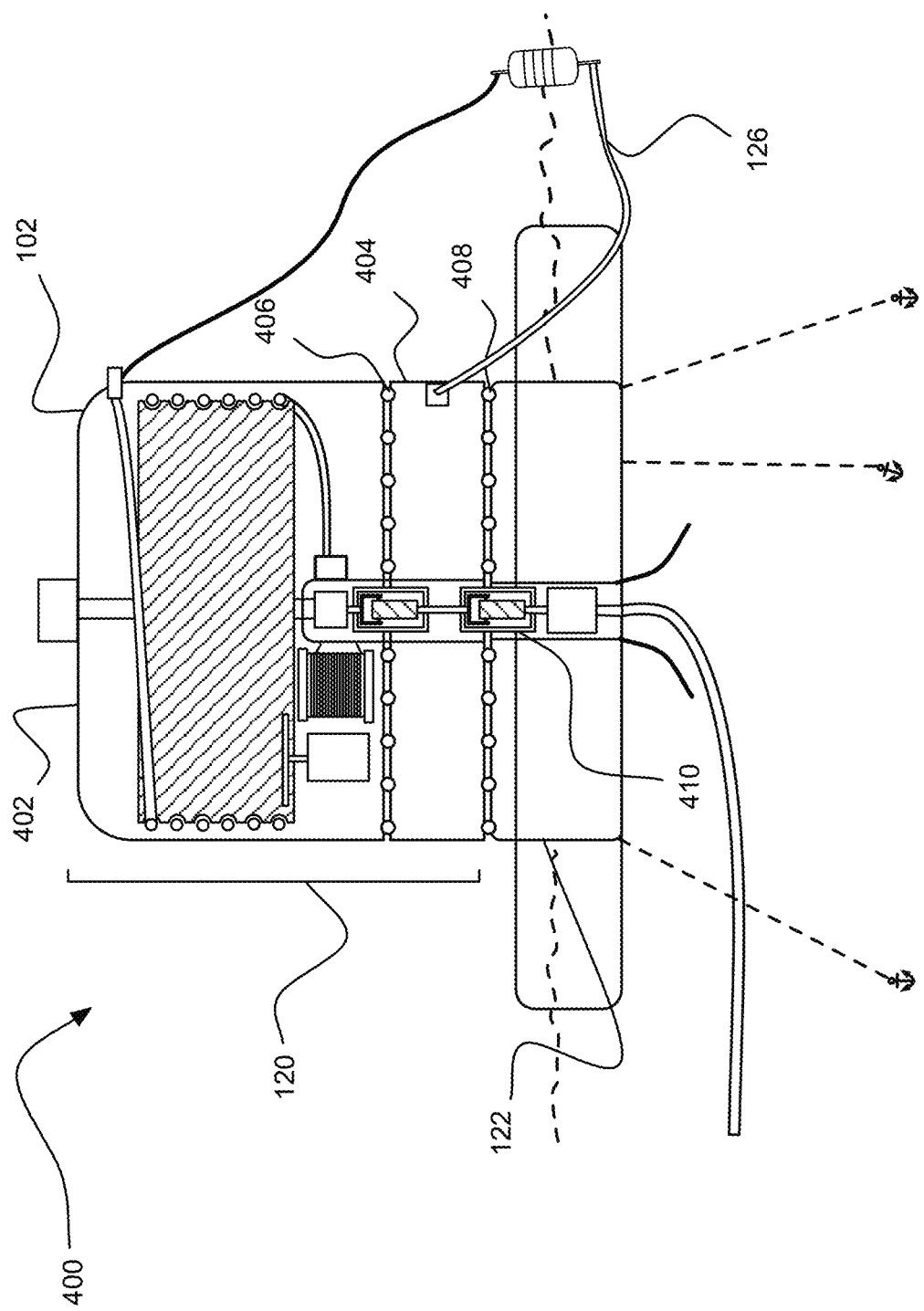

Another example will now be described in reference to FIG. 4. FIG. 4 shows a cross-sectional side view of a mooring buoy 400 according to an example. The mooring buoy 400 as shown in FIG. 4 is the same as discussed with respect to FIGS. 2 and 3, except that the mooring line 126 is connected to a different part of the floating body 102.

The rotatable portion 120 comprises a mooring line body portion 402 coupled to the mooring line 126 and an electric cable body portion 404 coupled to the output electrical cable 204. The rotatable portion 120 is rotatable with respect to the stationary portion 122. At the same time, the mooring line body portion 402 is rotatable with respect to the electric cable body portion 404.

The electric cable body portion 404 is rotatably mounted on the mooring line body portion 402 on a first bearing 406 such as a thrust bearing. The first bearing 406 is configured to support the weight of the electric cable body portion 404. The mooring line body portion 402 is rotatably mounted on the stationary portion 122 on a second bearing 408 such as a thrust bearing. The second bearing 408 is configured to support the weight of the electric cable body portion 404 and the mooring line body portion 402. In this way, the second bearing 408 is similar to the bearing 206 as discussed in reference to the examples shown in FIGS. 2 and 3. The first and second bearings 406, 408 can similarly be modified like the bearing 206 discussed in reference to the examples shown in FIGS. 2 and 3.

This means that the output electrical cable 204 and the mooring line 126 can rotate with respect to each other in addition to rotating with respect to the stationary portion 122. Accordingly, both the output electrical cable 204 and the mooring line 126 can be aligned in the same vertical plane. This means that there is limited or no angular deviation between the output electrical cable 204 and the mooring line 126 extending from the vessel 700 to the mooring buoy 100. The forces exerts on the output electrical cable 204 and the mooring line 126 in a circumferential direction about the mooring buoy 100 are the same. This means that the output electrical cable 204 is less likely to bend sideways as the vessel 700 weathervanes about the mooring buoy 100.

Optionally an additional motor is provided to effect rotational movement between the mooring line body portion 402 and the electric cable body portion 404. In other examples, there is no motor and the rotational movement between the mooring line body portion 402 and the electric cable body portion 404 is caused by the vessel 700 moving with respect to the mooring buoy 100.

As shown in FIG. 4, a second rotatable electrical connection 410 is provided. The second rotatable electrical connection 410 is the same as the rotatable electrical connection 226 discussed in reference to the examples shown in FIGS. 2 and 3.

The rotating electric cable body portion 404 mounted to the first bearing 406 means that the electric cable body portion 404 is able to follow the mooring line body portion 402 and the second bearing 408. This means the electric cable body portion 404 can follow the vessel movement as a slave function.

This slave functionality of the electric cable body portion 404 will ensure that the mooring line 126 and the output electric cable 204 extending from the mooring buoy 100 to the vessel 700 are always inline and at the same length avoiding vessel-cable strain issues.

The output electric cable 204 will therefore avoid any kind of overstrain from movement of the vessel 700, while continuously transferring electrical energy and telemetric signals.

Figure 5:
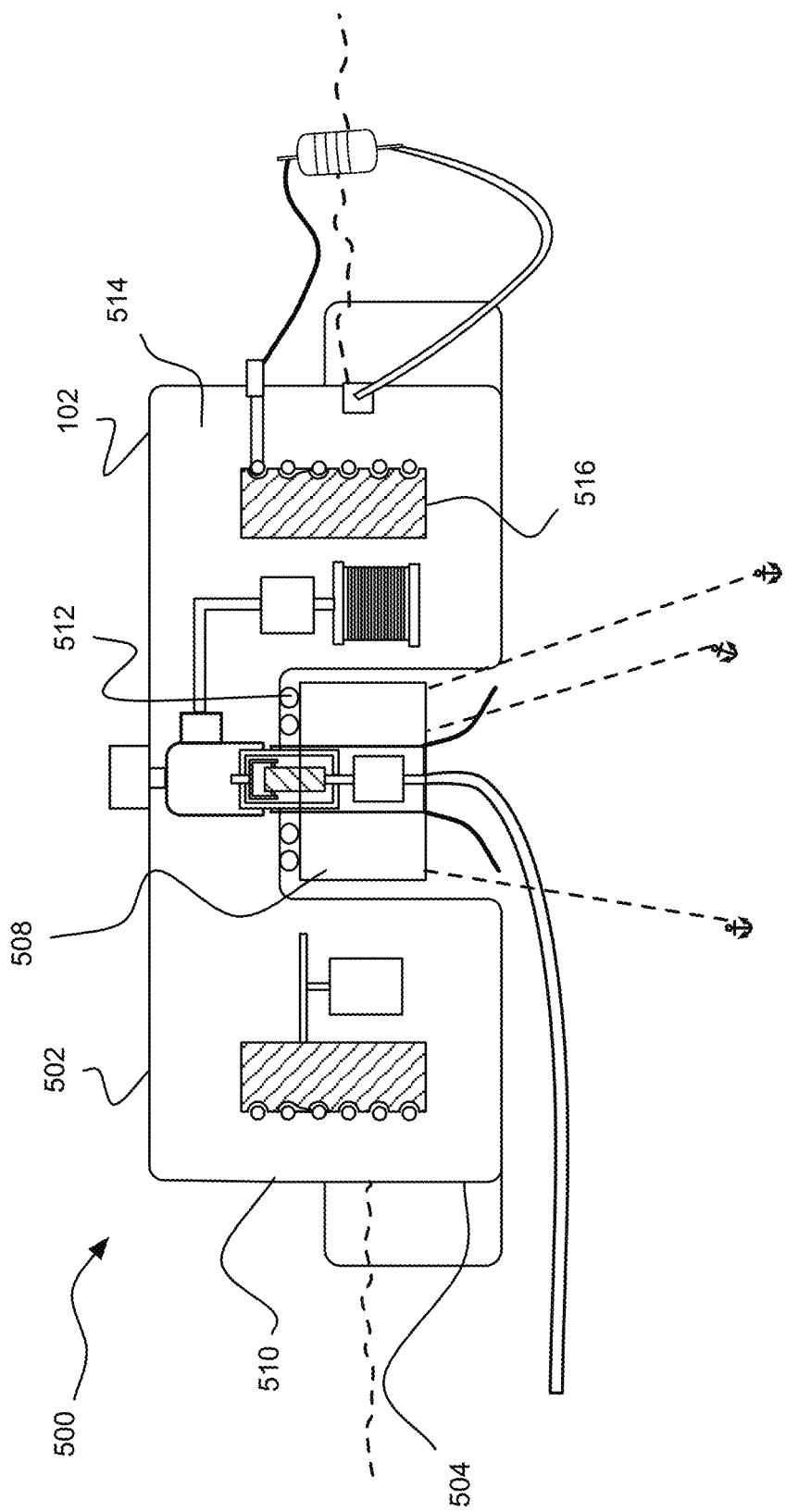

Another example will now be described in reference to FIG. 5. FIG. 5 shows a cross-sectional side view of a mooring buoy 500 according to an example.

The mooring buoy 500 as shown in FIG. 5 is the same as discussed with respect to FIGS. 2,3, and 4 except that the floating body 102 and the rotatable portion 502 have a low profile.

The rotatable portion 502 comprises an inner recess 506 for receiving the stationary portion 508. Similar to the examples discussed in reference to FIGS. 2 to 5, the rotatable portion 502 is rotatably mounted on the stationary portion 508 via a bearing 512. An annular wall 510 of the rotatable portion 502 surrounds the stationary portion 508. The annular wall 510 defines an annular cavity 514 for receiving the output electrical cable 204 and the other electrical components previously discussed. An annular rotatable drum 516 is mounted within the annular cavity 514.

In some examples, and as shown in FIG. 5, the rotatable portion 502 comprise a skirt 504 which extends below the stationary portion 508. This means that the centre of gravity of the mooring buoy 100 is lower and the stability of the mooring buoy 100 can be increased.

Another example will now be described in reference to FIG. 6. FIG. 6 shows a cross-sectional side view of a mooring buoy 600 according to an example. The mooring buoy 600 as shown in FIG. 6 is the same as discussed with respect to FIG. 2 except that the mooring line 126 is slidably mounted to the stationary portion 122. The mooring line 126 is coupled to a slider carriage 602 which is mounted on a circumferential rail 604. The circumferential rail 604 is fixed to the stationary portion 122. The slider carriage 602 comprises a slider eye 606 for attaching the mooring line 126 thereto. In some examples, the circumferential rail 604 comprises a "T" cross-sectional shape and the slider carriage 602 comprises a "C" cross-sectional shape arranged to surround the circumferential rail 604. The slider carriage 602 is arranged to slide around the circumferential rail 604 as the mooring line 126 is moved around the mooring buoy 100. In other examples, the mooring line 126 can be slidably mounted to the stationary portion 122 with any suitable mechanism.

This means that the forces exerted by the mooring line 126 can be transmitted directly to the stationary portion 122. This means that the bearing 206 can be smaller and experiences smaller forces from the tethered vessel 700.

Operation of the mooring buoy 100 will now be discussed in reference to FIGS. 7 to 10. FIGS. 7 to 10 show perspective views of the vessel 700 and the mooring buoy 100 according to an example.

Figure 7:
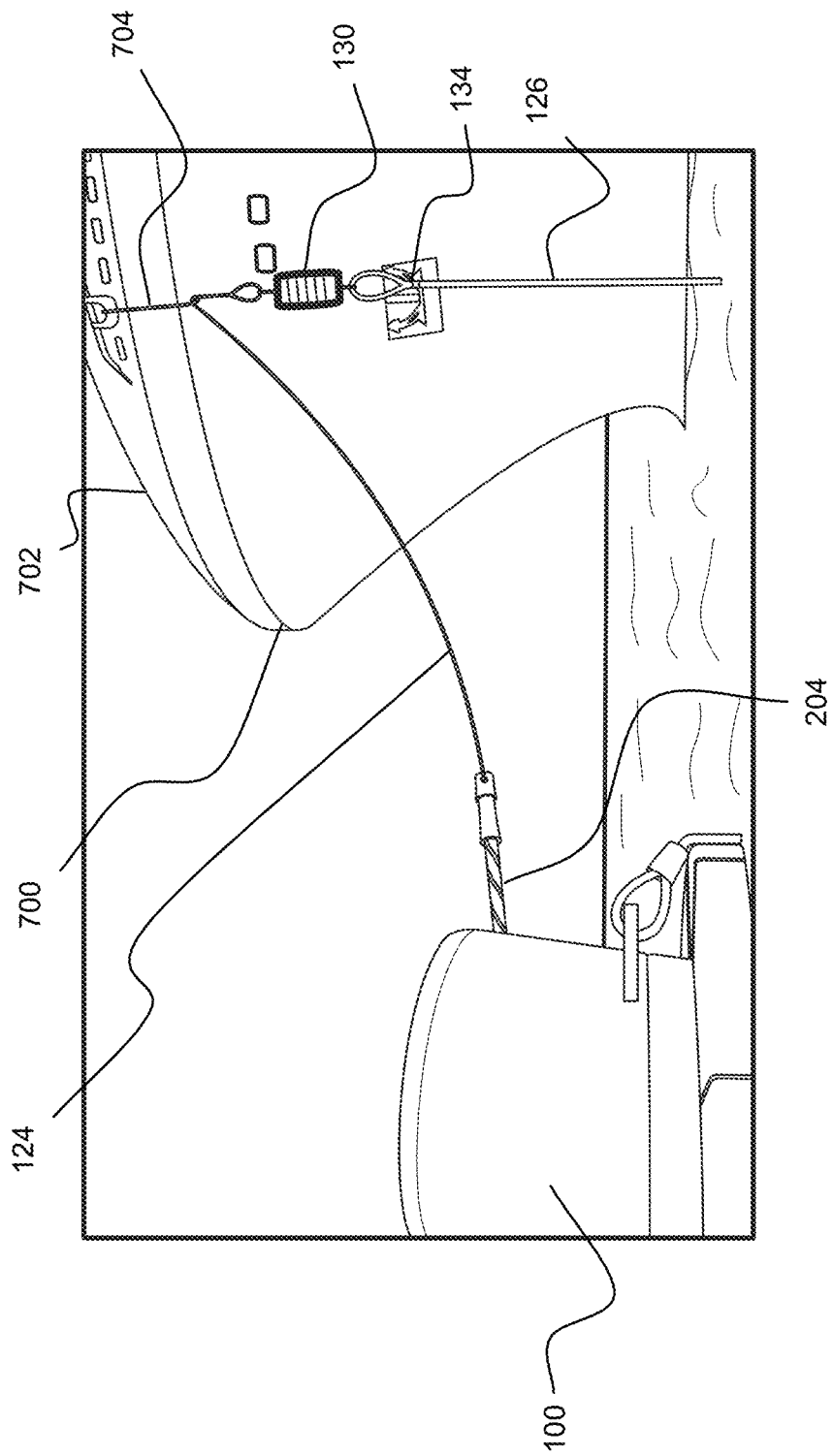
FIG. 7 shows a perspective view of the mooring buoy and vessel according to an example.
Figure 8:
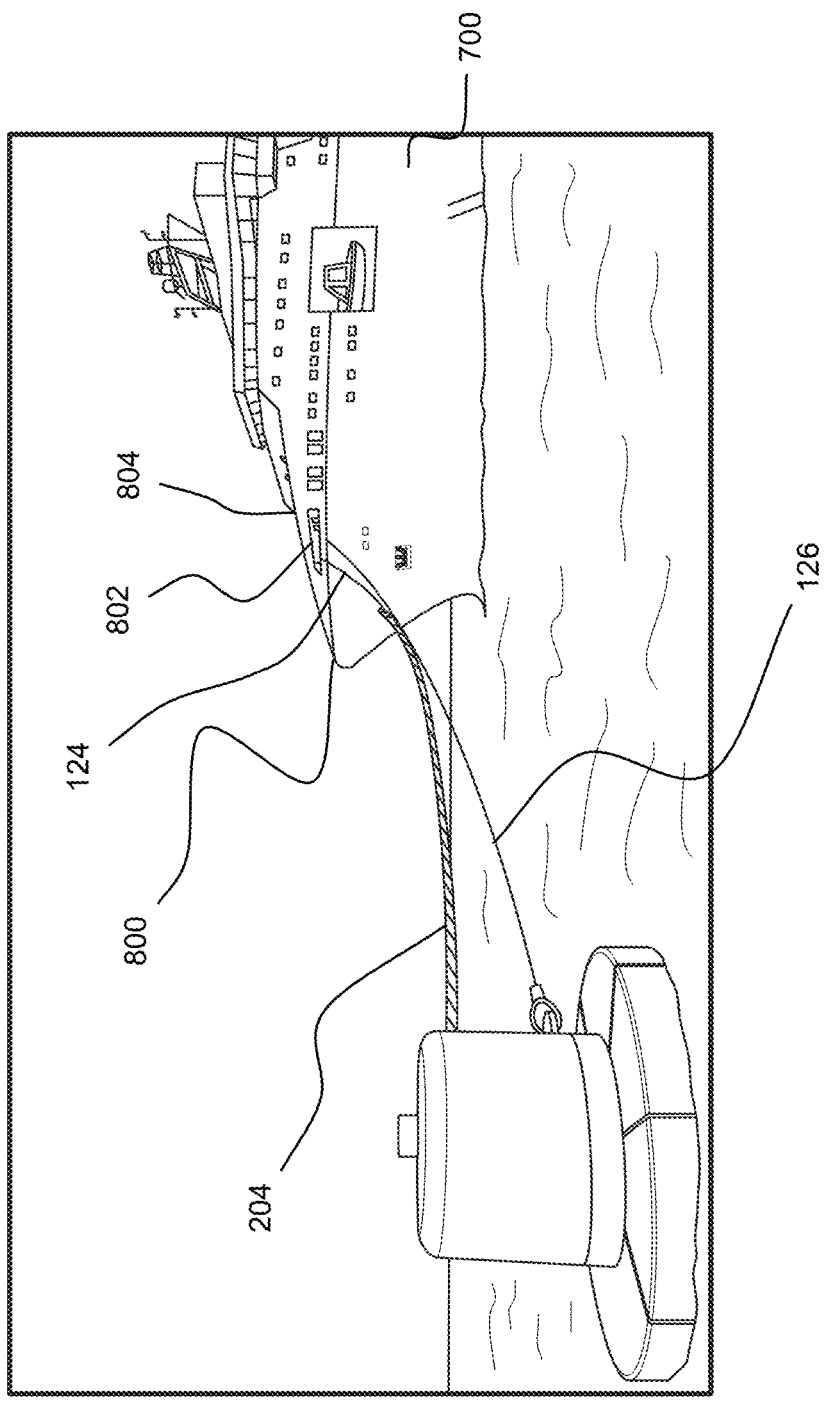
FIG. 8 shows a perspective view of the mooring buoy and vessel according to an example.
Figure 9:
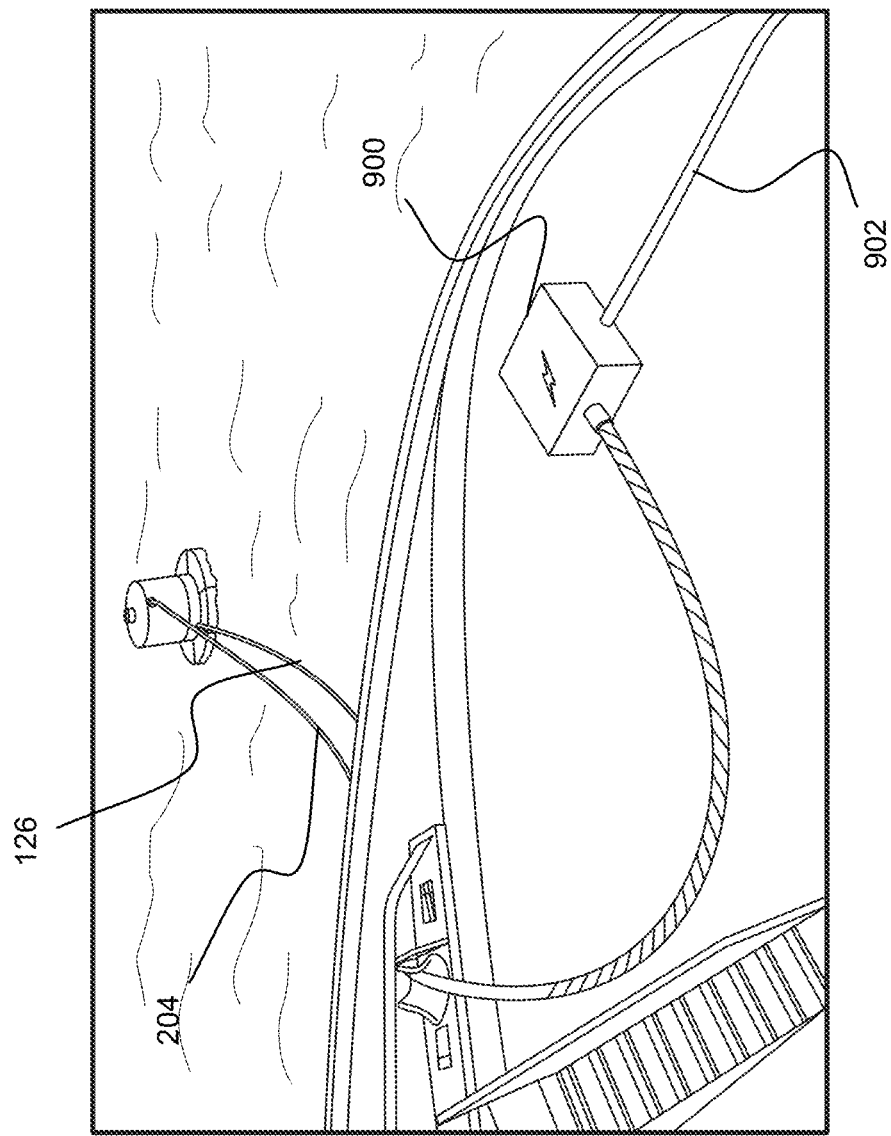
FIG. 9 shows a perspective view of the mooring buoy and vessel according to an example.

When the vessel 700 needs to moor, the vessel 700 approaches the mooring buoy 100 having identified the messenger line buoy 130. Only part of the vessel 700 is shown in FIGS. 7, 8, and 9 for the purposes of clarity. A deckhand will secure and lift the messenger line buoy 130 towards the deck 702. The deckhand may use a hook 704 for lifting the messenger line buoy 130. Additionally or alternatively, the deckhand may use lifting or winching equipment (not shown) for lifting the messenger line buoy 130.

As the messenger line 124 is lifted towards the deck 702 of the vessel 700, the mooring line 126 and the output electrical cable 204 are drawn towards the vessel 700. The output electric cable 204 is initially fully wound on the rotatable drum 216. By pulling the messenger line 124, the output electric cable 204 is extended.

The mooring line 126 is coupled to the messenger line buoy 130 at the second end 134. This means that the mooring line 126 is pulled onto the deck 702 before the output electric cable 204. In this way, the output electrical cable 204 does not clash with the mooring line 126 during the mooring operation.

In some less preferred examples, there is no messenger line 124. In this way, the mooring line 126 is drawn up to the vessel 700 and then the output electrical cable 204 is drawn up to the vessel 700.

Turning to FIG. 8, the mooring process will be described in further detail. The vessel 700 as shown in FIG. 8 has now moored to the mooring line 126 but the output electrical cable 204 is still to be connected to the vessel 700. The mooring line 126 is secured to a capstan (not shown) or another suitable mooring point on the vessel 700 by passing the mooring line 126 through a hole e.g. a hawsehole 802 in the bulwark 804. The hawsehole 802 is positioned on the side of the bow 800 of the vessel 700. However, in other examples, the mooring line 126 is connected via a hawsehole (not shown) in the foremost position on the bow 800 of the vessel 700. Once the mooring line 126 is tethered to the vessel 700, the messenger line 124 is pulled further on to the deck 702 of the vessel 700. The messenger line 124 is then used to pull up the output electrical cable 204 on to the vessel 700.

FIG. 9 shows both the mooring line 126 and the output electrical cable 204 connected to the vessel 700. In some examples, connector 212 of the output electrical cable 204 is connected with a socket or plug in a deck junction box 900 in the deck 702 of the vessel 700, at the bow 800 of the vessel 700. The deck junction box 900 is mounted on the deck 702 of the vessel 700 and is connected to an electrical circuit of the vessel 700. For example the deck junction box 900 is connected to the switchboard (not shown) of the vessel 700. In this way, when the connector 212 of the output electrical cable 204 is connected to the deck junction box 900, the output electrical cable 204 is electrically connected to the switchboard of the vessel 700. In some examples, the socket or plug in the deck 702 of the vessel 700 is retrofittable and an auxiliary cable 902 extends from the bow 800, side or stern of the vessel 700 to the switchboard of the vessel 700.

Figure 10:
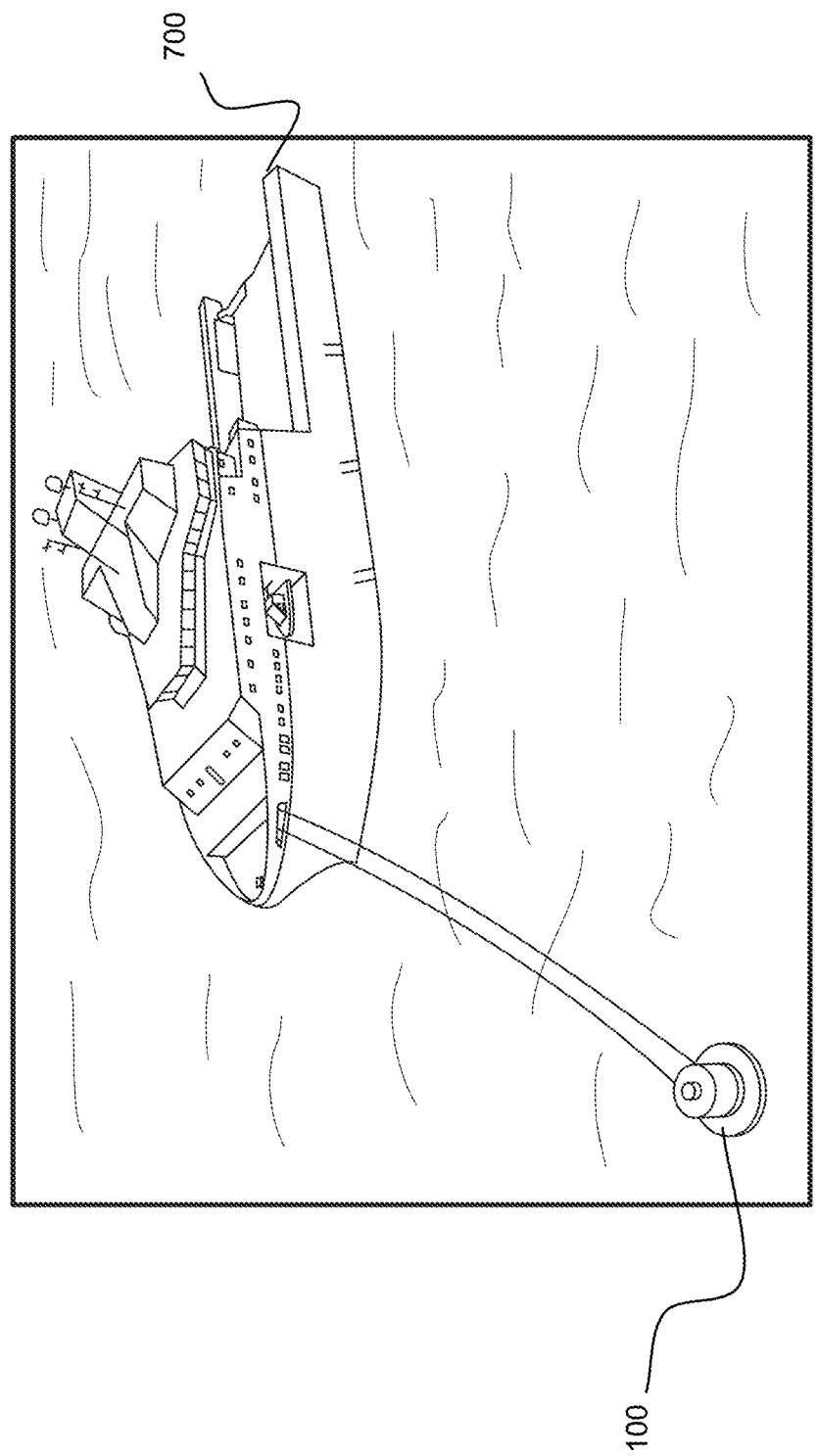
FIG. 10 shows a perspective view of the mooring buoy and vessel according to an example.

FIG. 10 shows the vessel 700 connected to both the mooring line 126 and the output electrical cable 204. The vessel 700 can then freely weathervane 360° about the mooring buoy 100 as the currents, tides and wind change whilst receiving power from the mooring buoy 100. In some examples, the mooring line 126 extends between 100 m to 200 m from the mooring buoy 100. In some examples the mooring line extends 150 m from the mooring buoy. The floating body 102 can optionally have a diameter of between 5 m to 15 m. This means that the output electric cable 204 can wrap around the rotatable drum 216 between 3 to 10 times.

Figure 11:
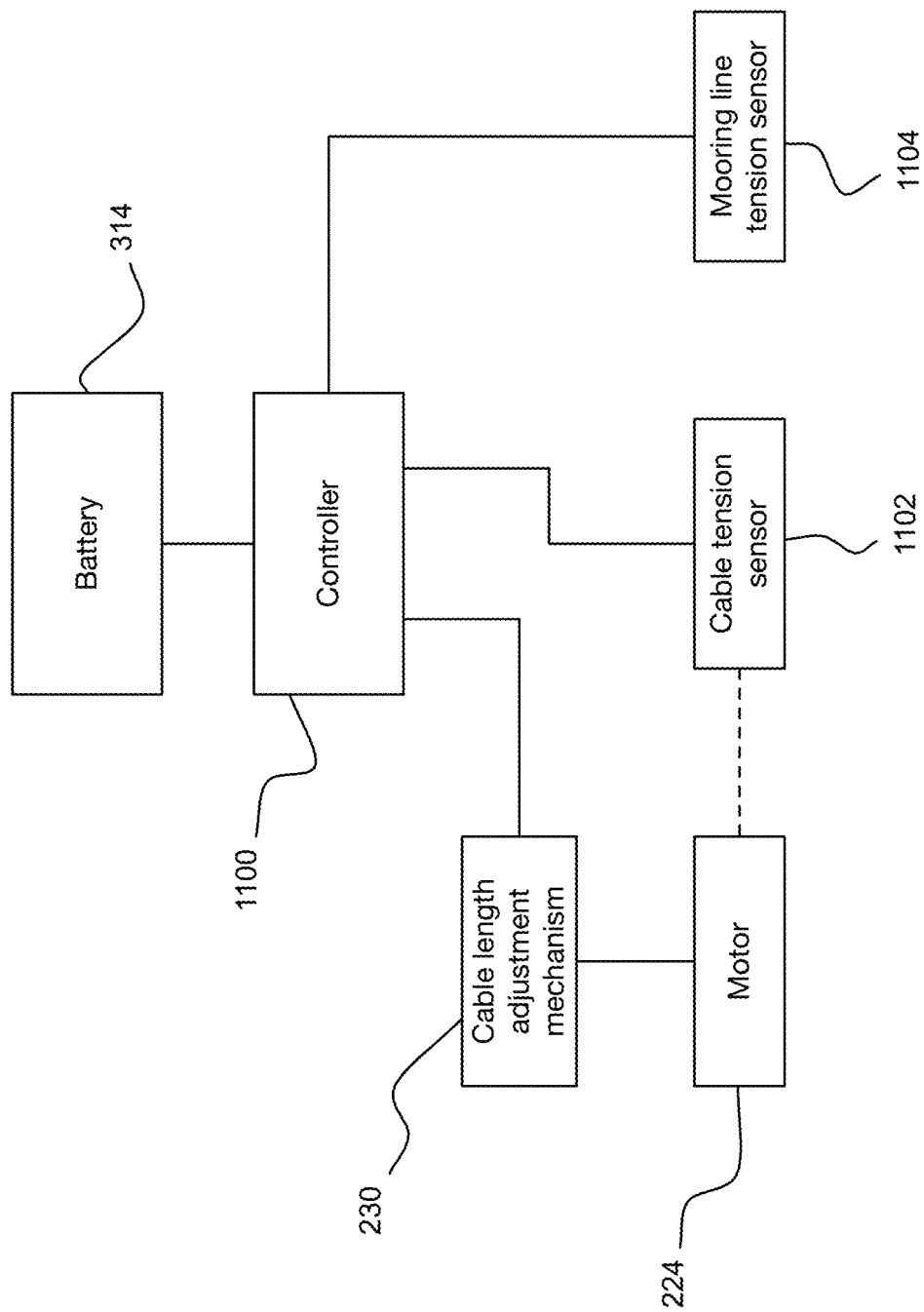
FIG. 11 shows a schematic view of the mooring buoy.
Figure 12:
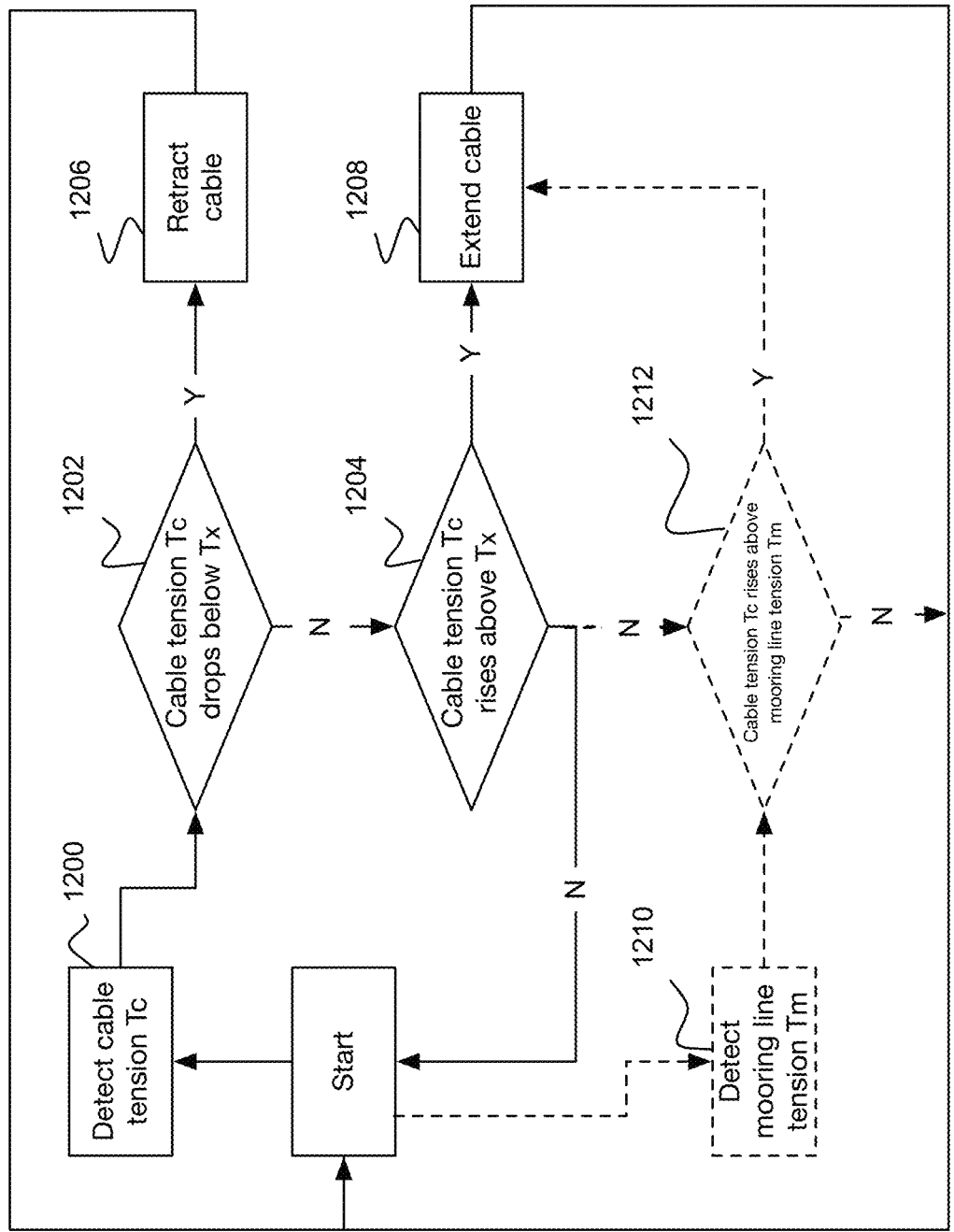
FIG. 12 shows a flow diagram of a method of operating the mooring buoy according to an example.

Managing the length of the output electric cable 204 will now be discussed in reference to FIGS. 11 and 12. FIG. 11 shows a schematic view of the mooring buoy 100 and FIG. 12 shows a flow diagram of a method of operating the mooring buoy 100 according to an example.

The mooring buoy 100 comprises a controller 1100 configured to control the cable length adjustment mechanism 230. The controller 1100 is mounted in the floating body 102. In some examples, the controller 1100 is mounted in the rotatable portion 120 adjacent to the cable length adjustment mechanism 230. The controller 1100 is configured to issue control signals to the electric motor 224 for rotating the rotatable drum 216 and retracting or extending the output electric cable 204.

In some examples, the controller 1100 is configured to issue a control signal to the electric motor 224 to extend or retract the output electric cable 204 in dependence of a detected tension in the output electric cable 204. In some examples the tension in the output electric cable 204 is determined by the controller 1100 in response to a signal from a cable tension sensor 1102 as shown in step 1200 of FIG. 12. The cable tension sensor 1102 in some examples is a separate sensor from the electric motor 224, for example the output electric cable 204 passes over a pulley (not shown) connected to a force sensor (not shown).

Additionally or alternatively, the cable tension sensor 1102 is the operational torque, voltage and/or current feedback from the electric motor 224 itself. In some examples, the controller 1100 comprises a converter unit motor drive and control system. In some other examples, the controller 1100 is connected to a separate a converter unit motor drive and control system. In yet some other examples, the controller 1100 is a converter unit motor drive and control system. The converter unit motor drive and control system is connected to an encoder (not shown) mounted on the drive shaft 308 of the electric motor 224. The encoder is configured to send signals to the converter unit motor drive and control system when the drive shaft 308 rotates. The controller 1100 determines the cable tension of the output electric cable 204 from the signals received from the encoder mounted on the drive shaft 308 of electric motor and stored parameter information of the drive pinion 310 e.g. a converter drive unit and the rotatable drum 216.

The controller 1100 receives the signal from the cable tension sensor 1102 and determines whether the tension of the output electric cable 204 is within a predetermined tension range. In some examples, the tension range of the output electric cable 204 is between 0N and 5 kN or 0N and 10 kN, or 0N and 15 kN, or 0N and 20 kN. In some other examples, the tension range of the output electric cable 204 is between 100 kN-10000 kN In some examples, the controller 1100 determines whether the output electric cable tension $T_c$ deviates from a predetermined optimal output electric cable tension $T_x$. In some examples, the optimal output electric cable tension $T_x$ is 100N, 200N, 500N, 1000N, 1500N, or 2000N. The optimal output electric cable tension $T_x$ may be determined from the type and length of the output electric cable 204. In some examples, the controller 1100 determines that the stress value S of the output electric cable 204 remains below 0.07 kN/mm².

For example, in step 1202 of FIG. 12, the controller 1100 determines that the output electric cable tension $T_c$ drops below the optimal output electric cable tension $T_x$. In step 1204 of FIG. 12, the controller 1100 determines that the output electric cable tension $T_c$ rises above the optimal output electric cable tension $T_x$. If the output electric cable tension $T_c$ has not deviated from the optimal output electric cable tension $T_x$, then the controller 1100 continues monitoring the tension in the output electric cable 204.

If the controller 1100 determines that the tension in the output electric cable 204 deviates from a tension range or an optimal output electric cable tension $T_x$, the controller 1100 sends a control signal to the electric motor 224 to extend or retract the output electric cable 204. For example, if the controller 1100 has determined that the output electric cable tension $T_c$ has dropped below the optimal output electric cable tension $T_x$, then the controller 1100 issues a control signal to the electric motor 224 to retract the output electric cable 204 as shown in step 1206.

If the controller 1100 has determined that the output electric cable tension $T_c$ has risen above the optimal output electric cable tension $T_x$, then the controller 1100 issues a control signal to the electric motor 224 to extend the output electric cable 204 as shown in step 1208. In this way, the controller 1100 maintains the tension $T_x$ in the output electric cable 204 at the optimal output electric cable tension $T_x$.

Optionally in some examples, the tension in the mooring line 126 is determined by the controller 1100 in response to a signal from a mooring line tension sensor 1104. The tension $T_m$ in the mooring line 126 is determined by the controller 1100 as shown in step 1210. The mooring line tension sensor 1104 is similar to the cable tension sensor 1102 as previously discussed.

The controller 1100 determines that the output electric cable tension $T_c$ rises above the mooring line tension $T_m$ in step 1212. If the controller 1100 has determined that the output electric cable tension $T_c$ has risen above the mooring line tension $T_m$, then the controller 1100 issues a control signal to the electric motor 224 to extend the output electric cable 204 as shown in step 1208. In this way, the controller 1100 is configured maintain the tension in the output electric cable 204 less than the tension in the mooring line 126 when the mooring line 126 and the output electric cable 204 are connected to the vessel 700.

The steps 1208, 1210 and 1212 of maintaining the output electric cable tension $T_c$ below the mooring line tension $T_m$ can be used separately or alternatively to the steps 1200, 1202, 1204, 1206, 1208 discussed above. Alternatively all the steps as shown in FIG. 12 can be used together for enhanced tension management.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

We claim:

1. A mooring buoy for a vessel, the mooring buoy comprising:
   a floating body including a first portion and a second portion, wherein the first portion is rotatable with respect to the second portion;
   at least one anchoring line connected between the second portion and a sea floor;
   at least one electric cable mounted on the first portion and connected to a power supply, the at least one electric cable having a free end connectable to an electric circuit of the vessel;
   at least one mooring line connectable between the floating body and the vessel; and
   a cable length adjustment mechanism configured to adjust a length of the at least one electric cable when the first portion rotates with respect to the second portion; wherein
   the first portion includes a mooring line body portion and an electric cable body portion, the mooring line body portion coupled to the mooring line and the electric cable body portion coupled to the at least one electric cable, and
   the mooring line body portion is rotatable with respect to the electric cable body portion.

2. The mooring buoy according to claim 1, wherein the cable length adjustment mechanism comprises a rotatable drum configured to spool the at least one electric cable.

3. The mooring buoy according to claim 2, wherein a rotation axis of the rotatable drum is aligned with a rotation axis of the first portion.

4. The mooring buoy according to claim 2, wherein the cable length adjustment mechanism comprises a motor coupled to the rotatable drum.

5. The mooring buoy according to claim 4, wherein the cable length adjustment mechanism comprises:
   a controller configured to issue control signals to the motor to rotate the rotatable drum and retract or extend the at least one electric cable.

6. The mooring buoy according to claim 1, wherein the cable length adjustment mechanism comprises:
   a tension sensor configured to detect a tension in the at least one electric cable.

7. The mooring buoy according to claim 5, wherein the cable length adjustment mechanism comprises:
   a tension sensor configured to detect a tension in the at least one electric cable; and wherein
   the controller is configured to issue a control signal to the motor to extend or retract the at least one electric cable based on the tension in the at least one electric cable.

8. The mooring buoy according to claim 7, wherein the controller is configured to maintain a tension in the at least one electric cable within a defined tension range.

9. The mooring buoy according to claim 1, wherein a tension in the at least one electric cable is less than a tension in the mooring line when the mooring line and the at least one electric cable are connected to the vessel.

10. The mooring buoy according to claim 1, wherein the mooring line is connected to the floating body at a position closer to a water level than a position where the at least one electric cable extends from the first portion to the vessel.

11. The mooring buoy according to claim 1, wherein the mooring line is connected to the first portion.

12. The mooring buoy according to claim 1, wherein the mooring line is slidably mounted to the second portion and arranged to slide around a perimeter of the second portion.

13. The mooring buoy according to claim 1, further comprising:
a fender configured to prevent the vessel colliding with the floating body.

14. The mooring buoy according to claim 1, further comprising:
an electrical slip ring mounted between the first portion and the second portion.

15. The mooring buoy according to claim 1, further comprising:
an input electric cable electrically connectable to the at least one electric cable.

16. The mooring buoy according claim 15, further comprising:
at least one junction box connected between the input electric cable and the at least one electric cable.

17. The mooring buoy according to claim 1, further comprising:
at least one transformer.

18. The mooring buoy according to claim 17, wherein the transformer is configured to supply voltage at 440V or 690V.

19. The mooring buoy according to claim 1, further comprising:
a battery electrically connected to the at least one electric cable, wherein
the battery is configured to supply electrical power to the at least one electric cable when the power supply is interrupted.

20. The mooring buoy according to claim 1, further comprising:
a moonpool configured to receive an input electric cable electrically connectable to the at least one electric cable.

21. The mooring buoy according to claim 20, wherein the moonpool comprises:
a cable funnel arranged to receive the input electric cable.

22. A mooring buoy for a vessel, the mooring buoy comprising:
a floating body including a first portion and a second portion, wherein the first portion is rotatable with respect to the second portion;
at least one anchoring line connected between the second portion and a sea floor;
at least one electric cable mounted on the first portion and connected to a power supply, the at least one electric cable having a free end connectable to an electric circuit of the vessel;
at least one mooring line connectable between the floating body and the vessel; and
a battery electrically connected to the at least one electric cable, the battery configured to supply electrical power to the at least one electric cable when the power supply is interrupted; wherein
the first portion includes a mooring line body portion and an electric cable body portion, the mooring line body portion coupled to the mooring line and the electric cable body portion coupled to the at least one electric cable, and
the mooring line body portion is rotatable with respect to the electric cable body portion.

23. A method of mooring a vessel with a mooring buoy having a floating body including a first portion and a second portion, wherein the first portion is rotatable with respect to the second portion and the mooring buoy includes at least one buoy anchoring line connected between the second portion and a sea floor, the method comprising:
connecting at least one mooring line between the floating body and the vessel;
extending a free end of at least one electric cable from the first portion, wherein the at least one electric cable is connected to a power supply;
connecting the free end of the at least one electric cable to an electric circuit of the vessel when the vessel is tethered to the at least one mooring line; and
adjusting, with a cable length adjustment mechanism, a length of the at least one electric cable when the first portion rotates with respect to the second portion; wherein
the first portion includes a mooring line body portion and an electric cable body portion, the mooring line body portion coupled to the mooring line and the electric cable body portion coupled to the at least one electric cable, and
the mooring line body portion is rotatable with respect to the electric cable body portion.

* * * * *